United States Patent [19]

Kinugasa et al.

[11] Patent Number: 5,475,426
[45] Date of Patent: Dec. 12, 1995

[54] METHOD AND APPARATUS FOR CONTROLLING AN ELECTRONIC ZOOM SYSTEM USING AN IMAGE PICK-UP ELEMENT

[75] Inventors: Toshiro Kinugasa, Hiratsuka; Takuya Imaide, Fujisawa; Hiroyuki Komatsu, Yokohama, all of Japan

[73] Assignees: Hitachi, Ltd., Tokyo; Hitachi Video & Information System, Inc., Kanagawa, both of Japan

[21] Appl. No.: 235,233

[22] Filed: Apr. 29, 1994

Related U.S. Application Data

[63] Continuation of Ser. No. 26,765, Mar. 5, 1993, abandoned.

[30] Foreign Application Priority Data

May 18, 1992 [JP] Japan .................................. 4-124468

[51] Int. Cl.⁶ .................................................. H04N 5/262
[52] U.S. Cl. ........................................... 348/240; 348/581
[58] Field of Search ................................ 348/240, 561, 348/581, 704; H04N 5/262, 5/44

[56] References Cited

U.S. PATENT DOCUMENTS

| 4,163,249 | 7/1979 | Michael | 358/180 |
|---|---|---|---|
| 4,682,243 | 7/1987 | Hatayama | 382/47 |
| 4,792,856 | 12/1988 | Shiratsuchi | 358/180 |
| 4,876,601 | 10/1989 | Hashimoto | 358/180 |
| 4,951,125 | 8/1990 | Kojima | 358/180 |
| 5,243,433 | 9/1993 | Hailey | 348/240 |
| 5,253,064 | 10/1993 | Yamamoto et al. | 358/180 |

OTHER PUBLICATIONS

Kinugasa, et al., "An Electronic Zoom Video Camera Using Image Scanner Control" pp. 501–505, 1991 IEEE, Yokohama, Japan.

Primary Examiner—James J. Groody
Assistant Examiner—Chris Grant
Attorney, Agent, or Firm—Antonelli, Terry, Stout & Kraus

[57] ABSTRACT

An electronic zoom system comprises a memory, a zoom operation processing circuit having a read/write control circuit for controlling the reading and writing of signals to and from said memory, respectively, and an operation control circuit for controlling said zoom operation processing circuit based upon a result of successive additions of $\beta-\alpha$, whereby a video signal is input to said zoom operation processing circuit for electronically magnifying and expanding said video signal by a magnification factor of $\beta/\alpha$. The electronic zoom system can reduce the power consumption of the control circuit and enhance the utilization efficiency of control data used for the control circuit.

34 Claims, 16 Drawing Sheets

# METHOD AND APPARATUS FOR CONTROLLING AN ELECTRONIC ZOOM SYSTEM USING AN IMAGE PICK-UP ELEMENT

This application is a continuation application of Ser. No. 08/026,765, filed Mar. 5, 1993, now abandoned.

BACKGROUND OF THE INVENTION

The present invention relates to a system for electronically magnifying and expanding a picture, in particular, to a method for controlling the enlargement and expansion suitable for an image pickup system using an image pickup element.

The functions which users demand have been diversified in association with prevailing camcorders. Among these demanded functions, a higher zoom ratio and magnification factor are most prevalent. Products including a zoom lens having a higher magnification factor such as 12 or 16 have been made available. On the other hand, demand for compact and light weight products is strong, as well. However, the above mentioned two demands are not simultaneously satisfied even if a high zoom magnification factor is attempted by providing only a zoom lens. Therefore, so called electronic zooming for electronically magnifying and expanding an image has attracted attention.

In the signal processing for electronic zooming, a video signal which has been interpolated from an original signal representing an image is generated. Various techniques for the interpolation have been proposed. One of them is described in, for example, U.S. Pat. No. 4,774,581. The configuration of the above mentioned prior art is shown in FIG. 1. In the drawing, a reference numeral 73 denotes a memory; 74, an interpolation circuit; 75, a coefficient generating circuit and 76, a memory control circuit. The interpolation circuit 74 generates an interpolation signal (zoom processing signal) S out(m) from two original signals S in(n)+S in(n+1) by an operation as follows:

$$S\ \text{out}(m) = (1-a) \times S\ \text{in}(n) + a \times S\ \text{in}(n+1) \tag{1}$$

An additional coefficient "a" and a numeral n are provided for the original signals in formula (1).

In the above mentioned prior art, the electronic zoom magnification factor is represented as $\beta/\alpha$ and $\alpha$ is added m times in the coefficient generating circuit 75. At this time $\alpha$ is successively added. If the result of the addition exceeds $\beta$, $\alpha$ is added to a value which is the result of the addition minus $\beta$ at next addition. In view of implementation of the system with ICs, operation of binary numbers is preferable for the above mentioned addition. Operation wherein the addition result exceeds $\beta$ can be easily performed using an overflow in an adder. In other words, the operation can be performed by simply successively adding $\alpha$ if an A-bit adder is used and $\beta$ is preset to the Ath power of 2.

However, overflows frequently occur in the adder in the vicinity of a magnification factor of 1, which is frequently used, by comparison, since the electronic zoom magnification factor is represented as $\beta/\alpha$. This results in an increase in power comsumption. If $\alpha$ and $\beta$ are preset to, for example, 8 and 256, respectively, $\alpha$=256 when the magnification factor is 1. An overflow occurs whenever addition is performed. When the magnification factor is 2, $\alpha$= 128. An overflow occurs once per two addition operations. Furthermore, 9-bit data is necessary to preset $\alpha$ in the range of 1 to 256. Therefore, a most significant bit is only used for presetting 256, resulting in a low wiring efficiency of the system.

SUMMARY OF THE INVENTION

It is an object of the present invention to overcome the above mentioned problems.

In order to accomplish the above mentioned object, the present invention provides a system in which an electronic zoom ratio or magnification factor which is represented as $\beta/\alpha$ is used, and an original signal of an image and an addition coefficient which are provided for signal interpolation (zoom operation processing) are preset in accordance with a result of successive addition of $\beta$-$\alpha$.

When the magnification factor is in the vicinity of 1 which is frequently used, $\beta$-$\alpha$ is approximate to 0. Since an overflow hardly ever occurs, power comsumption can be suppressed. For example, when the factor is 1, $\beta$-$\alpha$ =0. No change in state between high and low occurs in an adder. If the adder is implemented with a CMOS device, the power consumption is zero.

If the electronic zoom factor is preset to one of Ath power of 2, it suffices to preset $\beta$-$\alpha$ in the range of 0 to the Ath power of 2 minus 1. Since only the A bit data is necessary, the wiring efficiency of the system is high.

DESCRIPTION OF THE PREFERRED EMBODIMENTS

Figure 2:
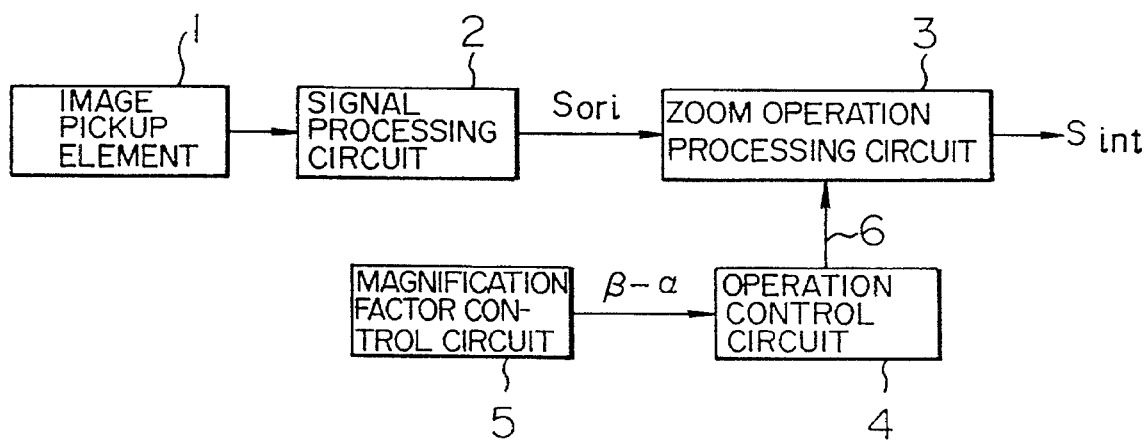
FIG. 2 is a block diagram showing an embodiment of an electronic zoom system of the present invention.

One embodiment of the present invention is shown in FIG. 2. In the drawings, a reference numeral 1 denotes an image pickup element; 2, a signal processing circuit; 3, a zoom operation processing circuit; 4, an operation control circuit; 5, a magnification factor control circuit; a 6, an operation control signal. A video signal which is output from the image pickup element 1 is subjected to general camera signal processing such as gamma processing by the signal processing circuit 2. Although an A/D converter is not shown in the drawing, it is assumed that a video signal output from the signal processing circuit 2, that is, a video signal $S_{ori}$ prior to zoom processing, be a digital signal.

The operation control circuit 4 is supplied with $\beta$-$\alpha$ from the magnification factor control circuit 5 based upon an electronic zoom magnification factor $\beta/\alpha$.

If the circuit is arranged so that $\beta$ is preset to 256, for example, and $\alpha$ can be preset within the range from 1 to 256 with a tele- and wide switch, a user can select a desired electronic zoom magnification factor by an operation similar to lens zooming operation. Such an operation can easily be implemented with a micro computer.

Figure 3:
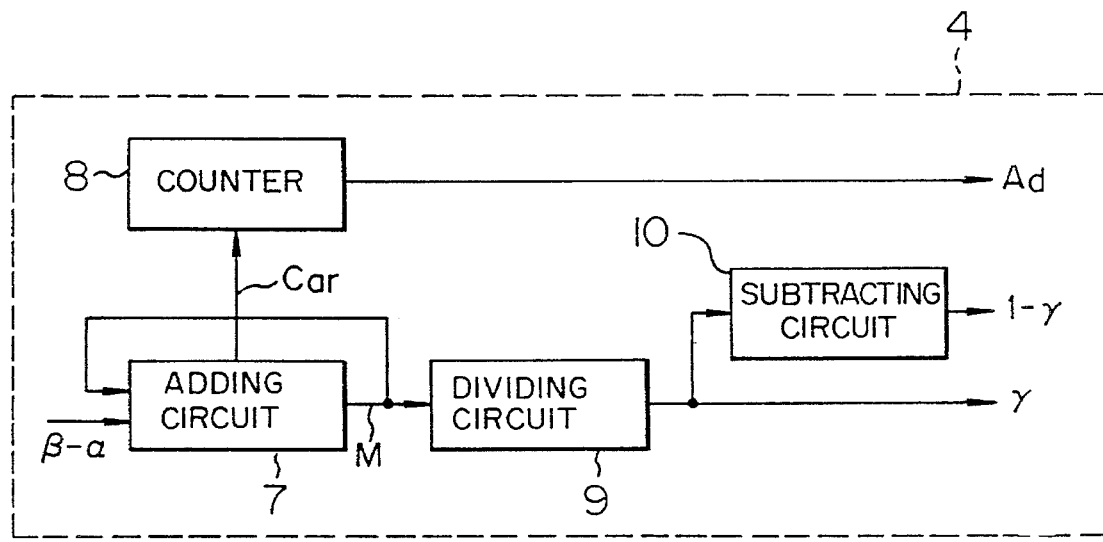
FIG. 3 is a block diagram showing an operation control circuit in the foregoing embodiment.

The operation control circuit 4 generates an operation control signal 6 by successively adding $\beta$-$\alpha$ supplied from the magnification factor control circuit 5. An example of the operation control circuit 4 is shown in FIG. 3. In the drawing, a reference numeral 7 denotes an adding circuit, 8 a counter, 9 a dividing circuit and 10 a subtracting circuit. Operation of the adding circuit 7 and the counter 8 will be described with reference to FIG. 4.

Figure 4:
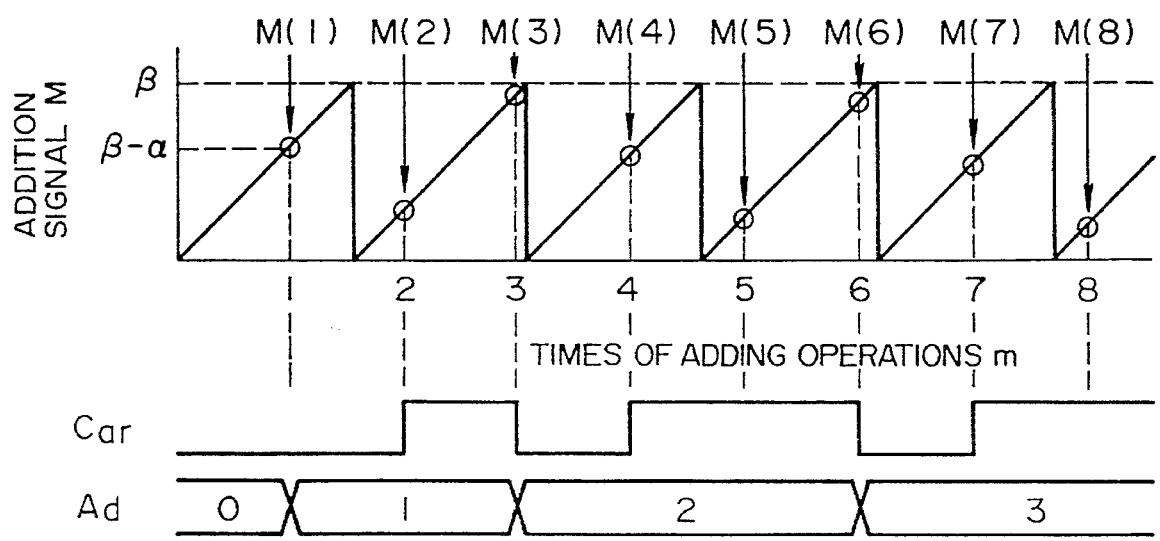
FIG. 4 is a timing chart showing the operation of an adding circuit and a counter circuit in the foregoing embodiment.

The adding circuit 7 uses a result of one adding operation for the next adding operation. When the adding result is $\beta$ or more, the adding circuit 7 brings a carry signal $C_{ar}$ high and uses the adding result minus $\beta$, that is, the remaining value after overflow for the next adding operation. Accordingly, the addition signal M changes M(1), M(2), ... as shown in FIG. 4 depending upon the time of adding operations. The carry signal $C_{ar}$ becomes high when an overflow occurs. When the carry $C_{ar}$ is high, the counter 8 holds the value of an address $A_d$. When the carry $C_{ar}$ is low, the counter 8 increments the value of the address $A_d$ by one. The addition signal M is input to the dividing circuit 9 in which calculation of M/$\beta$ is performed to obtain an addition coefficient $\gamma$. If $\beta$ is preset to the Ath power of 2 at this time, it suffices for the dividing circuit 9 to shift A bits. The addition coefficient $\gamma$ is input to the subtracting circuit 10 to provide 1–$\gamma$. The address $A_d$, and the addition coefficients $\gamma$, 1–$\gamma$ are output from the operation control circuit 4 as operation control signals.

Figure 5:
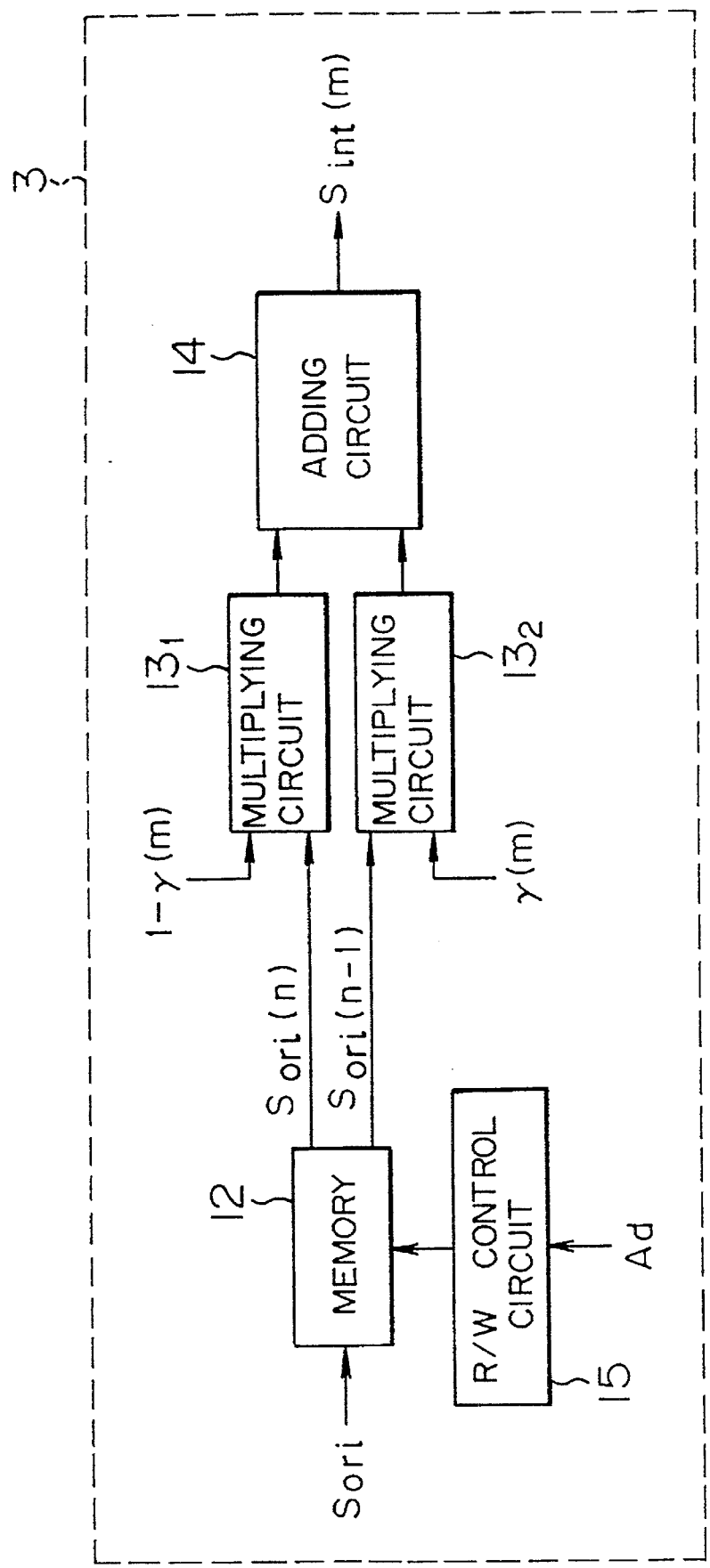
FIG. 5 is a block diagram showing a zoom operation circuit in the foregoing embodiment.

An example of the zoom operation processing circuit 3 is shown in FIG. 5. In the drawing, reference numeral 12 denotes a memory; 13, a multiplying circuit; 14, an adding circuit; and 15, a R/W control circuit. The video signal $S_{ori}$ is successively written into the memory 12 at respective addresses by the R/W control circuit 15. On reading, the nth and (n–1)th video signals $S_{ori}(n)$ and $S_{ori}(n-1)$ which are selected by the value n of the address Ad are simultaneously read. The video signal $S_{ori}(n-1)$ may be generated by delaying the video signal $S_{ori}(n)$ by means such as sample holding. The following operation is performed by the multiplying circuit 13 and the adding circuit 14 based upon the video signals $S_{ori}(n)$ and $S_{ori}(n-1)$ which were read from the memory 12 to generate the mth video signal $S_{int(m)}$ which was subjected to interpolation, i.e. zoom processing.

$$S_{int}(m) = \gamma(m) \times S_{ori}(n-1) + (1-\gamma(m)) \times S_{ori}(n) \quad (2)$$

wherein $$\gamma(m) = M(m)/\beta$$

$$M(m) = m \times (\beta-\alpha) - k \times \beta$$

provided that $k \times \beta \leq m \times (\beta-\alpha) < (k+1) \times \beta$ $$n = A_d$$
$$= m - k$$

The foregoing operation will be described by way of a detailed example of FIG. 6 in which $\beta$=256 and $\alpha$=192 (zoom magnification factor is 4/3).

Figure 6:
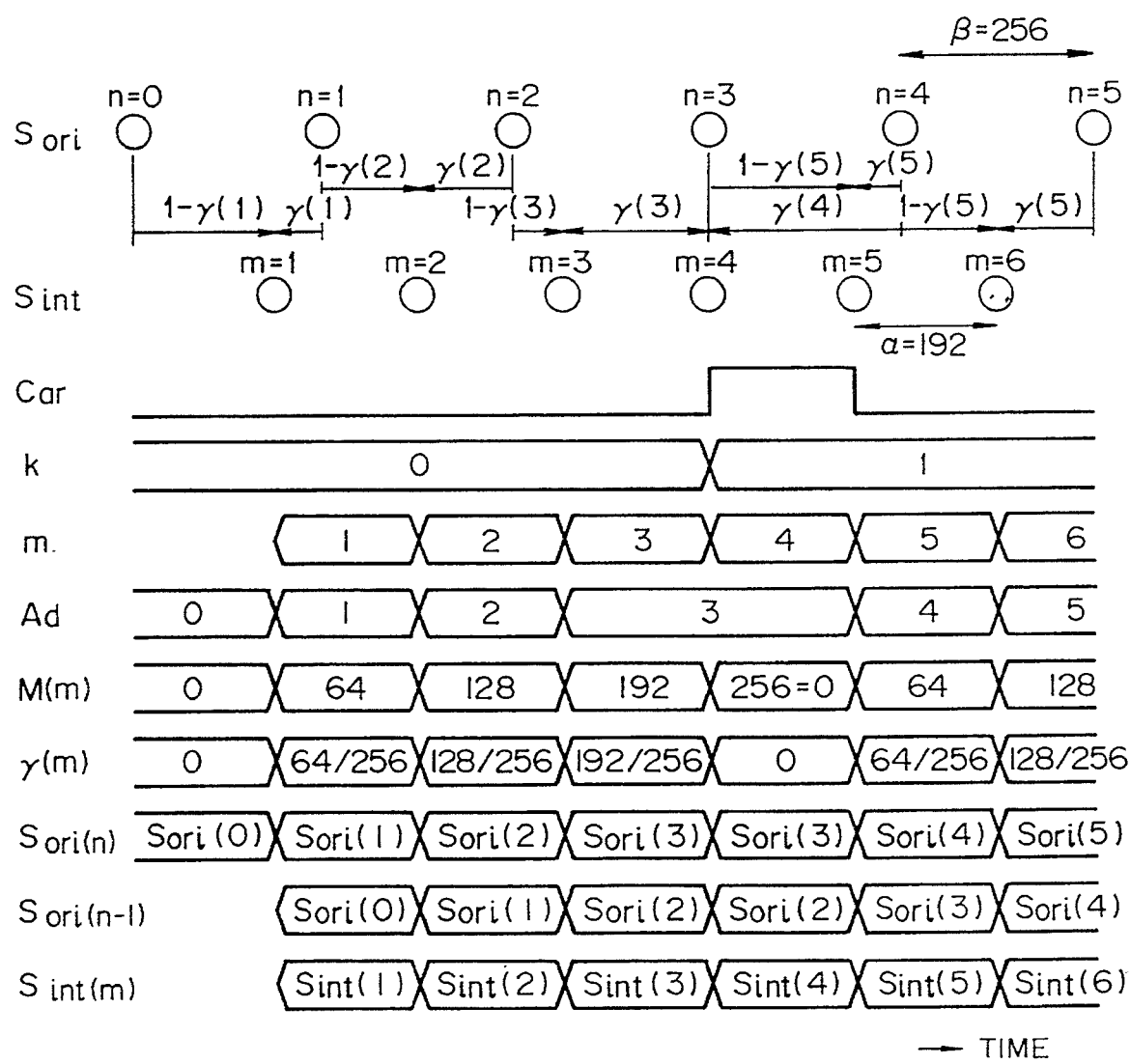
FIG. 6 is a chart showing the operation of the circuits shown in FIGS. 3 and 5.

FIG. 6 shows changes in respective signals with time and shows spatial positional relationship between the video signals $S_{ori}(n)$ and $S_{int}(m)$. If the spatial distance of the video signal $S_{ori}(n)$ prior to zoom processing is represented as $\beta$, the distance between $S_{ori(n)}$ and $S_{int}(m)$ when $S_{ori}(n)$ are spaced at a distance $\beta$ and $S_{int}(m)$ is spaced at a distance $\alpha$ can be represented by addition coefficient $\gamma(m)$ since the spatial distance of the video signal Sint(m) after zoom processing is represented by $\alpha$. As the distance $\gamma(m)$ increases, the contribution magnification factor of $S_{ori(n)}$ to $S_{int}(m)$ decreases. The video signal $S_{int}(m)$ after zoom processing is generated by performing a linear interpolation based upon formula (2) using the two adjacent video signals $S_{ori}(n)$ and $S_{ori}(n-1)$ in the present embodiment. The present embodiment for determining the above mentioned distance is also effective for the other interpolation system.

Figure 7A:
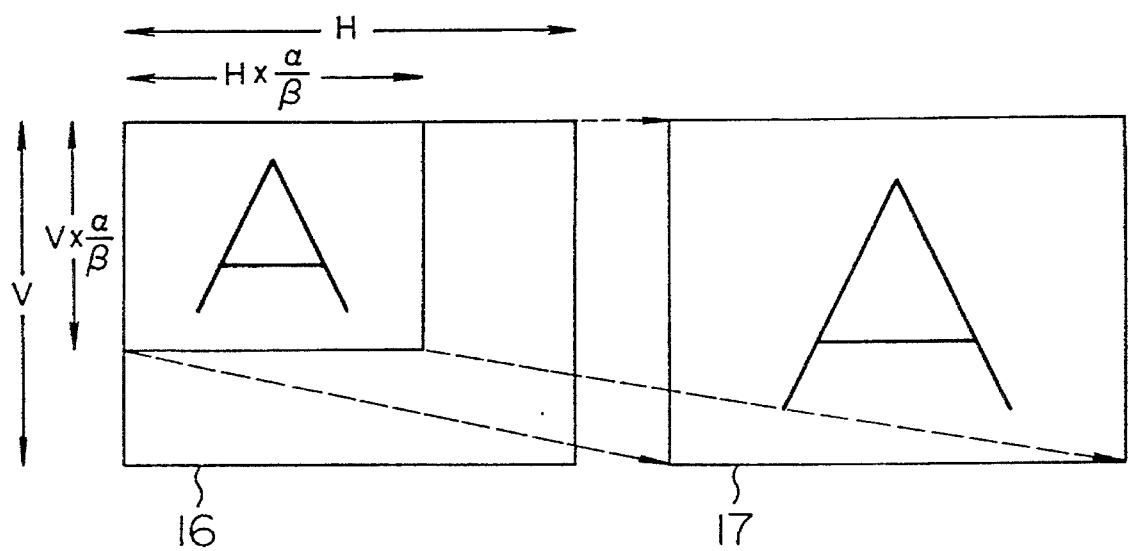
FIGS. 7A and 7B are views showing shot images taken in the foregoing embodiment.
Figure 7B:
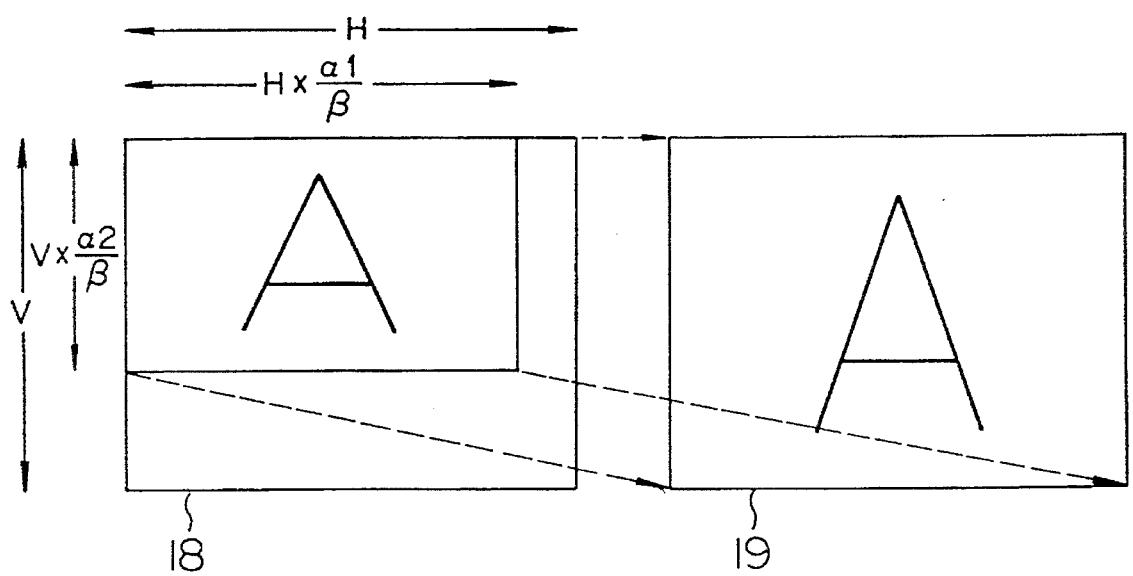

Examples of images which are shot in the foregoing embodiment are shown in FIGS. 7A and 7B. In the FIGS. 7A and 7B, reference numerals 16 and 18 denote photodetecting faces of the image pickup element 1; 17 and 19 denote monitor screens. A character A which is imaged on an illustrated area having dimensions H×$\beta/\alpha$ and V×$\beta/\alpha$ in horizontal and vertical directions, respectively on the photodetecting face 16 of the image pickup element 1 having dimensions H and V in horizontal and vertical directions, respectively, is magnified by a magnification factor of $\beta/\alpha$ and is displayed on the monitor screen 17 by applying the present embodiment in horizontal and vertical directions. The above mentioned embodiment is independently applicable in horizontal and vertical directions. FIGS. 7B shows an example of an image in which the zoom magnification factors. in horizontal and vertical directions are preset to $\beta/\alpha$1 and $\beta/\alpha$2, respectively.

Figure 8:
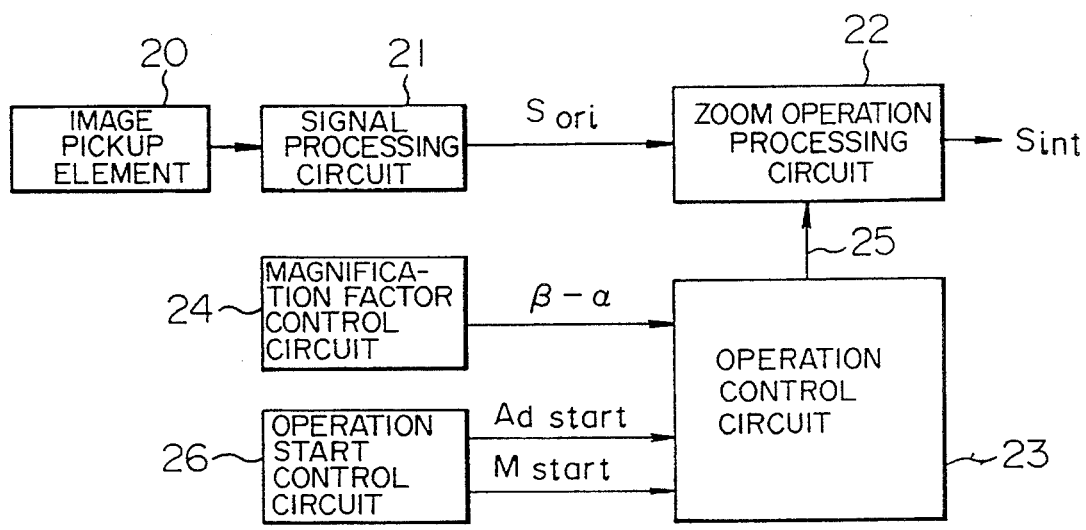
FIG. 8 is a block diagram showing an alternate embodiment of an electronic zoom system.

Another embodiment of the present invention is shown in FIG. 8. In the drawing, reference numeral 20 denotes an image pickup element 20; 21, a signal processing circuit; 22, a zoom operation processing circuit; 23, an operation control circuit; 24, a magnification factor control circuit; 25, an operation control signal; a 26, an operation start control circuit. The present embodiment is different from the embodiment shown in FIG. 2 in that the operation start control circuit 26 is added. The operation start control circuit 26 supplies the operation control circuit 23 with an operation start address $A_{d\ start}$ and an operation start addition signal $M_{start}$ for presetting the state when the operation control circuit 23 starts operation.

Figure 9:
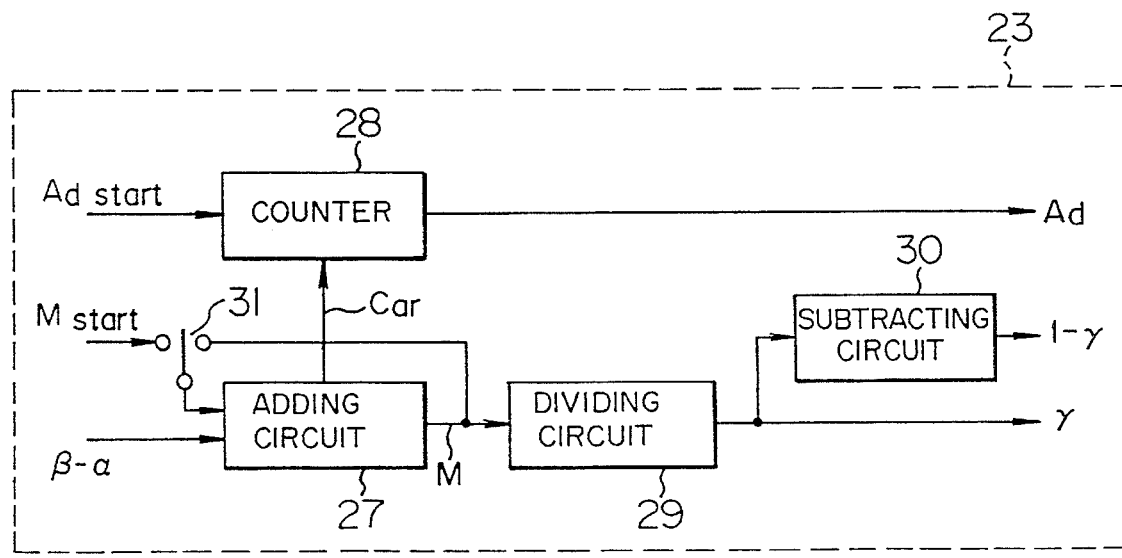
FIG. 9 is a block diagram showing an operation control circuit in the alternate embodiment.

An example of the operation control circuit 23 is shown in FIG. 9. In the drawing, reference numeral 27 denotes an adding circuit; 28, a counter; 29, a dividing circuit; and 30, a subtracting circuit; 31, a switch. The present example is different from the example of FIG. 3 in two points as follows:

(1) An adding signal which is added to β-α by the adding circuit 27 at first time is switched to $M_{start}$ by the switch 31. The adding signal which is added at a second time and subsequent times is switched to M by the switch 31.

(2) The operation start address $A_{d\ start}$ is input to the counter 28. The address $A_d$ is successively updated from the value of the input $A_{d\ start}$. This operation has been known as a load to counter.

Figure 10:
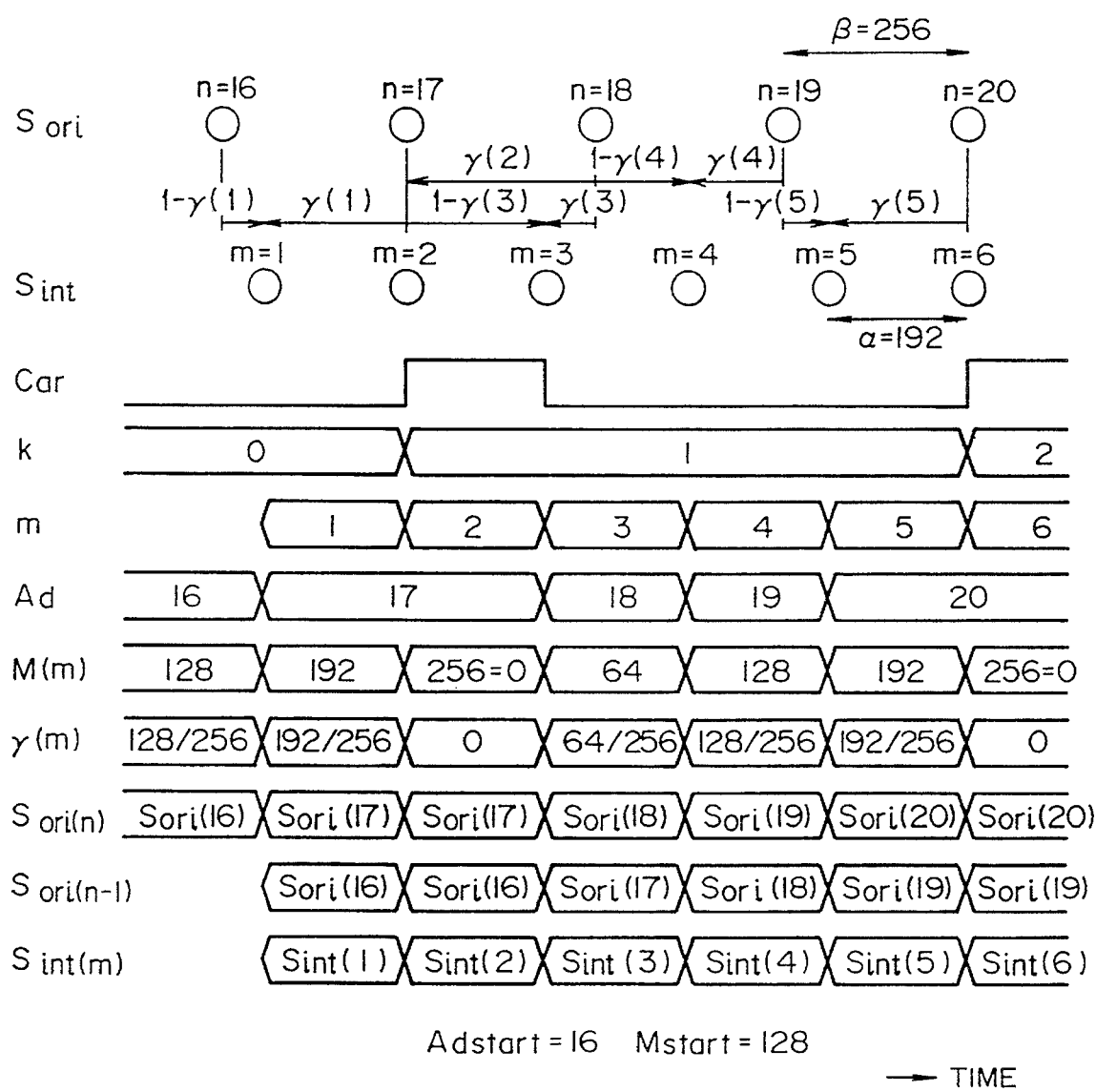
FIG. 10 is a timing chart showing the operation of the operation control circuit and the zoom operation processing circuit in the alternate embodiment.

Operation of the present embodiment will be described with reference to FIG. 10. FIG. 10 shows a case in which β and α are preset to 256 and 192, respectively (zoom magnification factor is 4/3), and $A_{d\ start}$ and $M_{start}$ are preset to 16 and 128, respectively. The address $A_d$ is incremented by one from a value 16 which is preset by $A_{d\ start}$ when the carry $C_{ar}$ is low. Accordingly, the video signals prior to zoom processing which are used for generating the video signal $S_{int}(1)$ after zoom processing in the first operation are $S_{ori(16)}$ and $S_{ori}(17)$. The value of the addition coefficient γ is updated as shown in the drawing since what is added to β-α=64 at the first time is 128 (=$M_{start}$). At this time, the spatial positional relationship between the video signal $S_{ori}(n)$ prior to zoom processing and the video signal $S_{int}(m)$ after zoom processing is as shown in the drawing. In other words, the optical image which is imaged by the image pickup element 20 at desired position can be magnified and expanded by changing $A_{d\ start}$ and $M_{start}$. The above mentioned operations and processing are expressed by expressions as follows:

$$S_{int}(m)=\gamma(m)\times S_{ori}(n-1)+(1-\gamma(m))\times S_{ori}(n)$$

wherein $$\gamma(m)=M(m)/\beta$$

$$M(m)=(m\times(\beta-\alpha)+M_{start})-k\times\beta \quad (3)$$

provided that $k\times\beta \leq m\times(\beta-\alpha) < (k+1)\times\beta$ $$n = A_d$$
$$= m - k + A_{d\ start}$$

Figure 1:
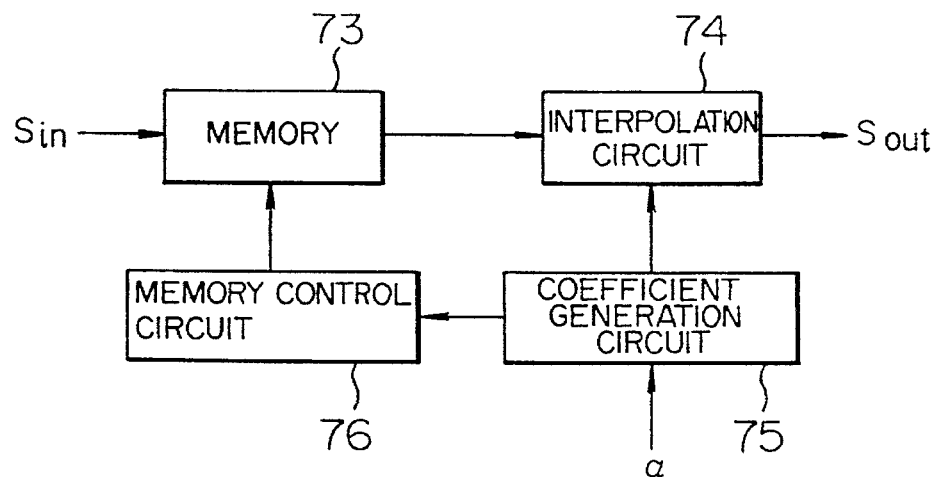
FIG. 1 is a block diagram showing a conventional electronic zoom system.
Figure 11A:
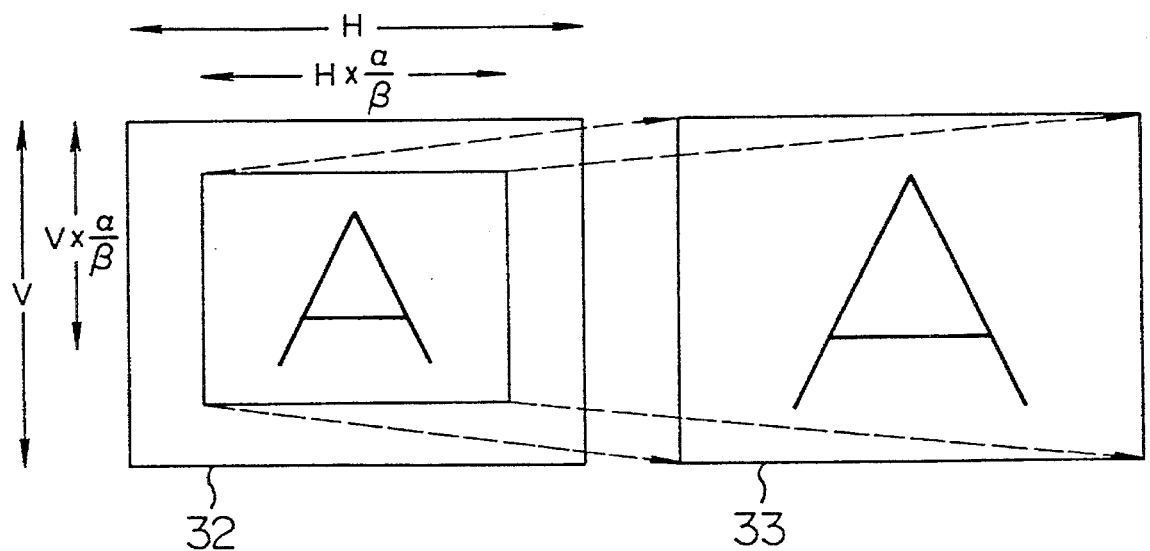
FIGS. 11A and 11B are views showing images taken in the alternate embodiment.
Figure 11B:
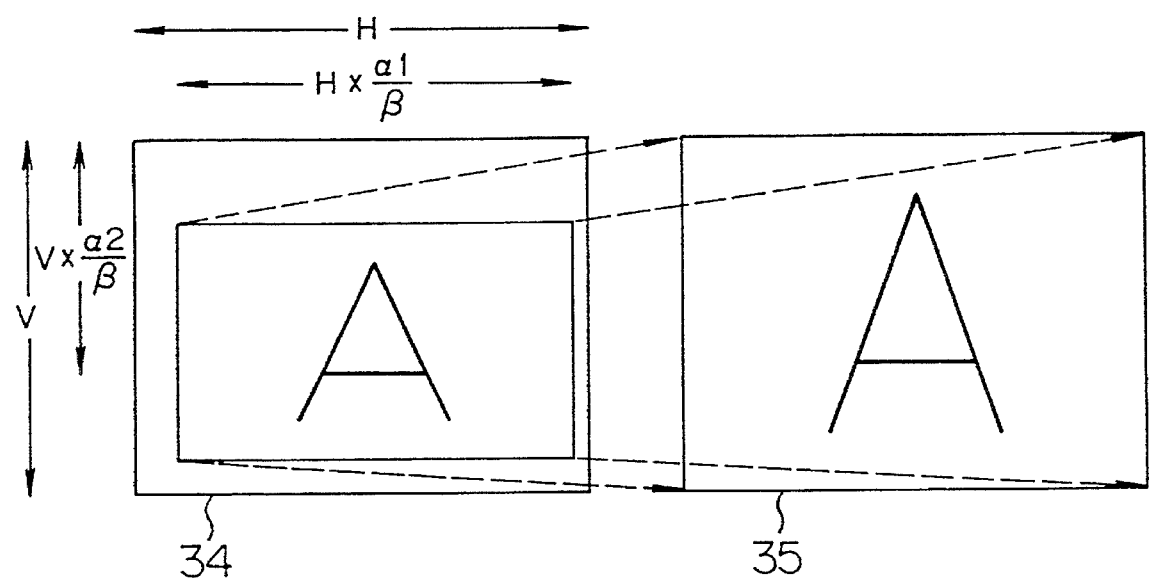

Examples of images which are taken in the foregoing embodiment are shown in FIGS. 11A and 11B. In the FIGS. 11A and 11B, reference numerals 32 and 34 denote photodetecting faces of the image pickup element 20; 33 and 35, denote monitor screens. A character A which is imaged on an illustrated area having dimensions H×α/β and V×α/β in horizontal and vertical directions, respectively, on the photodetecting face 32 of the image pickup element 20 having dimensions H and V in horizontal and vertical directions, respectively, is magnified by a magnification factor of β/α and is displayed on the monitor screen 33 by applying the present embodiment in both the horizontal and vertical directions. The above mentioned embodiment is independently applicable in horizontal and vertical directions similarly to the embodiment of FIG. 1. FIG. 11B shows an example of an image in which the zoom magnification factors in horizontal and vertical directions are preset to β/α1 and β/α2, respectively, and $A_{d\ start}$ and $M_{start}$ are preset to values which are different in horizontal and vertical directions.

The image pickup elements 1 and 20 need not be used in the foregoing embodiment and a video signal from a different signal source may be used.

Figure 12:
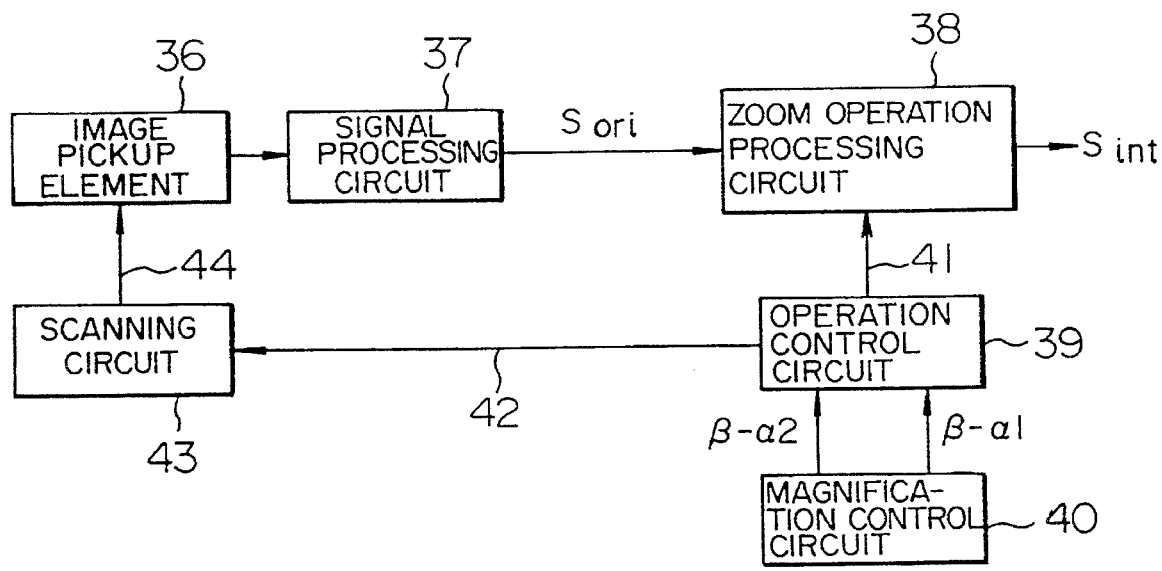
FIG. 12 is a block diagram showing a further embodiment of an electronic zoom system of the present invention.

A further embodiment of the present invention is shown in FIG. 12. In the drawing, a reference numeral 36 denotes an image pickup element; 37, a signal processing circuit; 38, a zoom operation processing circuit; 39, an operation control circuit; 40, a magnification factor control circuit; 41, an operation control signal; 42, a scanning control signal; 43, a scanning circuit; and 44, a scanning pulse. The present embodiment is different from the embodiment shown in FIG. 1 in that the scanning circuit 43 is added to the embodiment shown in FIG. 1. Vertical scanning in the image pickup element 36 is controlled based upon the zoom magnification factor β/α2 in the vertical direction so that a video signal which is enlarged by a magnification factor of β/α2 in the vertical direction is output from the image pickup element 36. Interpolation (zoom processing) in the vertical direction and enlargement and interpolation in the horizontal direction is performed in the zoom operation processing 38.

Figure 13:
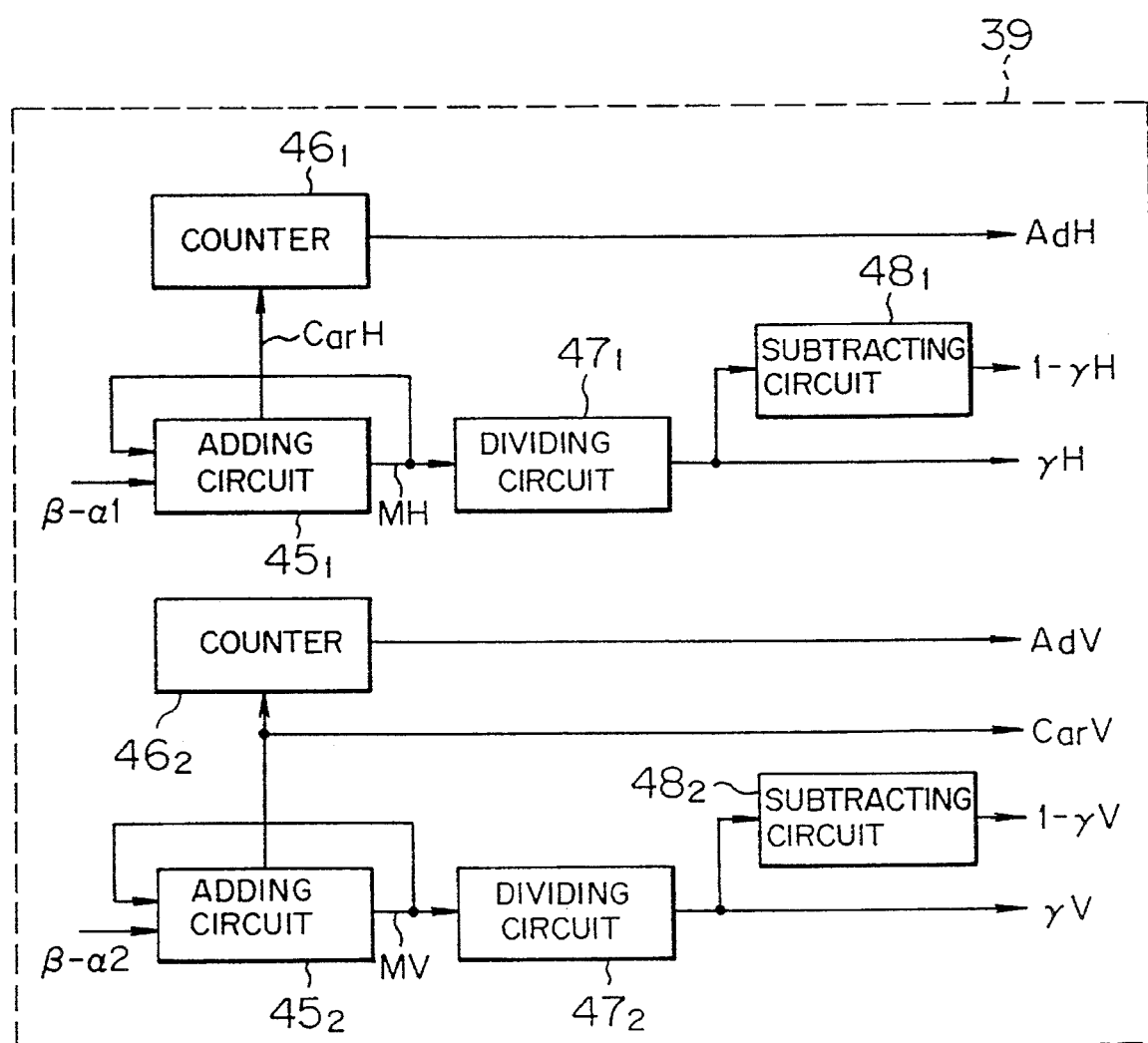
FIG. 13 is a block diagram showing an operation control circuit in the further embodiment.

An example of the operation control circuit 39 is shown in FIG. 13. In the drawing, reference numeral 45 denotes an adding circuit; 46, a counter; 47, a dividing circuit and 48, a subtracting circuit. This example is different from the example of FIG. 3 in that respective adding circuits, etc. are provided for control in the horizontal and vertical directions and in that a vertical control carry $C_{ar}$ V is output for the scanning control signal 42. Since respective operations using β-α1 and β-α2 are identical with those in the example of FIG. 3, description is omitted herein.

Figure 14:
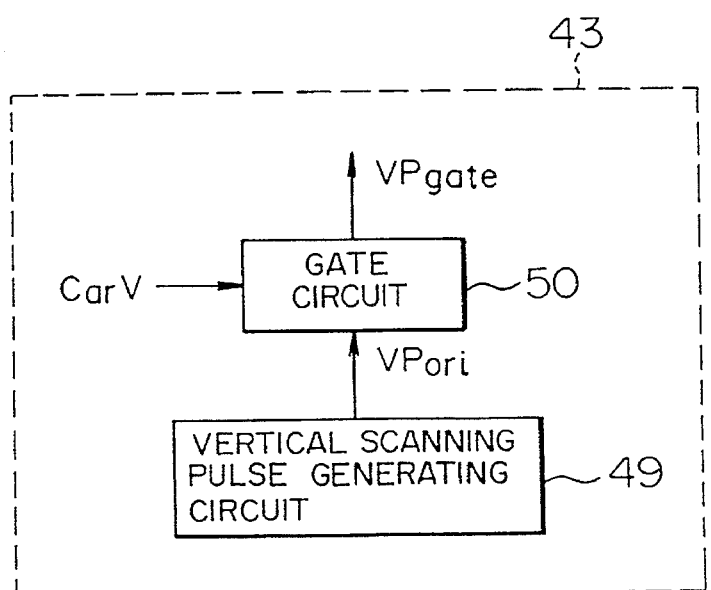
FIG. 14 is a block diagram showing a scanning circuit in the further embodiment.

An example of the scanning circuit 43 is shown in FIG. 14. In the drawing, reference numeral 49 denotes a vertical scanning pulse generating circuit; 50 a gate circuit. The vertical scanning pulse generating circuit 49 inputs a usual vertical scanning pulse $VP_{ori}$ to the gate circuit 50 so that a vertical scanning pulse $VP_{gate}$ is output from the gate circuit 50 when the carry $C_{ar}$ V is high. Description of other pulses such as a horizontal scanning pulse is omitted herein since they are not directly related to the present embodiment.

Figure 15:
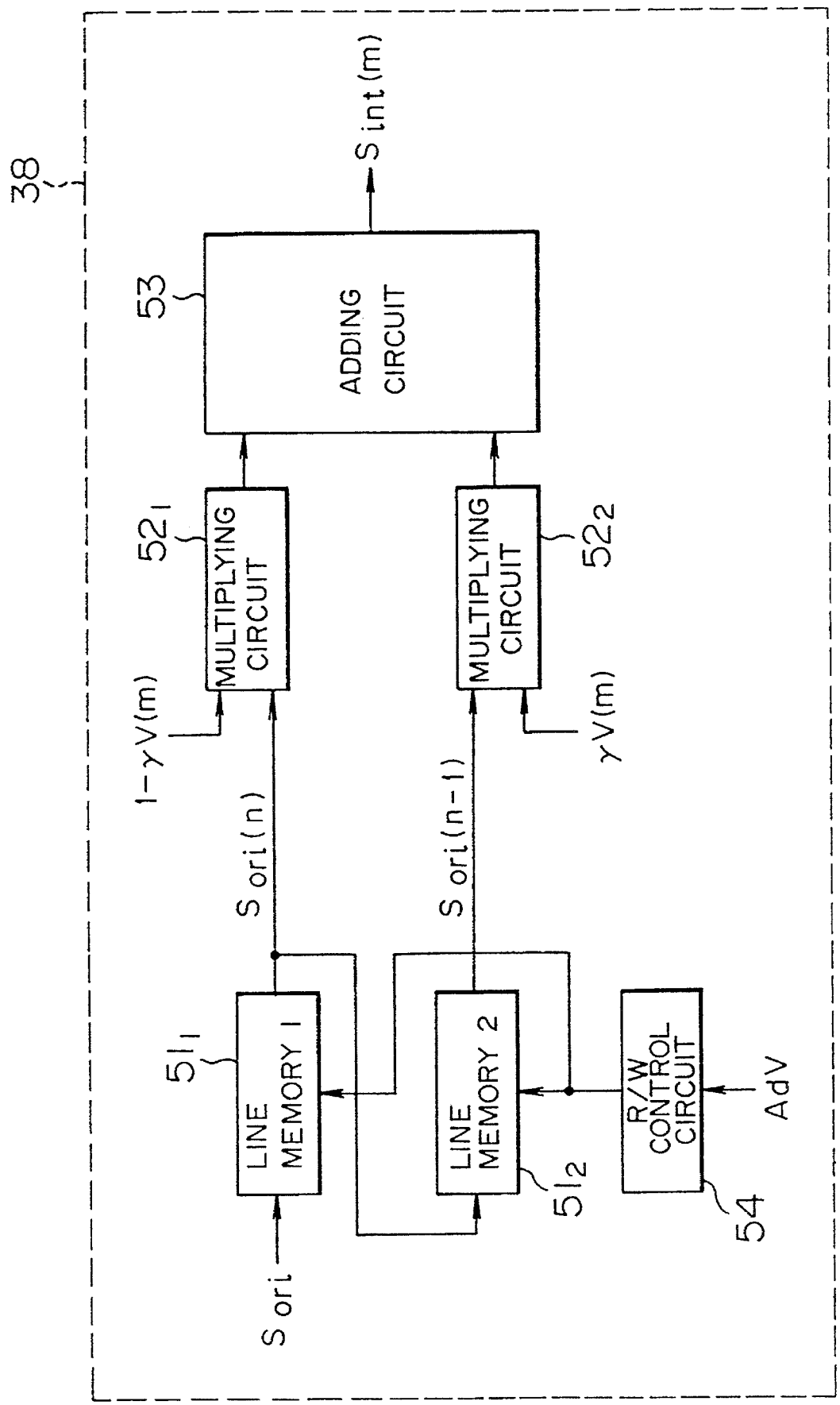
FIG. 15 is a block diagram showing a zoom operation processing circuit in the further embodiment.

An example of the zoom operation processing circuit 38 is shown in FIG. 15. In the drawing, reference numeral 51 denotes a line memory; 52, a multiplying circuit; 53, an adding circuit; and 54, a R/W control circuit. A video signal $S_{ori}$ prior to zoom processing is input to the line memory 51, and the output of the line memory $51_1$ is input to the multiplying circuit $52_1$ and is also input to the line memory $51_2$. The line memory $51_2$ delays the input video signal to output a video signal $S_{ori(n-1)}$ in the (n-1)th line when a video signal $S_{ori}(n)$ in the nth line is output from the line memory $51_1$. Although FIG. 15 shows processing in the vertical direction, processing in the horizontal direction can be performed similarly to that in the vertical direction by providing a sample-hold circuit in lieu of the line memory.

Figure 16:
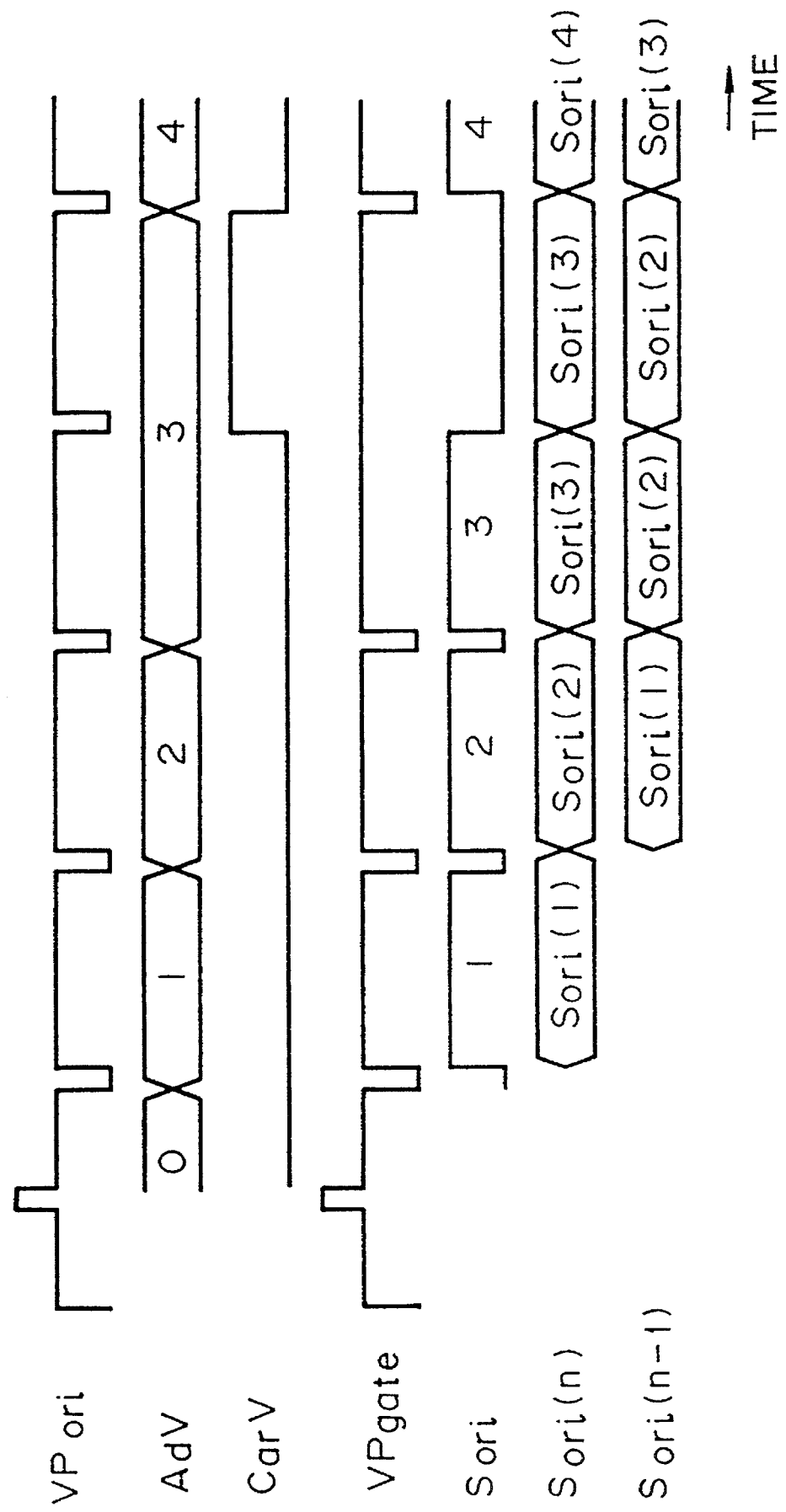
FIG. 16 is a timing chart explaining the operation of the circuits shown in FIGS. 13, 14 and 15.

Operation of the above mentioned embodiment is shown in FIG. 16. A usual vertical scanning pulse $VP_{ori}$ is passed through a gate as a vertical scanning pulse $VP_{gate}$ when the carry $C_{ar}$ V is high. Since signal read n out from the image pickup element 36 is stopped when the pulse is passed through the gate, $S_{ori}(3)$ and $S_{ori}(2)$ are output again from the line memories $51_1$ and $51_2$. In other words, the image is magnified and expanded in the vertical direction. Although magnification and expansion of image in the vertical direction are performed by the R/W control of the memory in the embodiment of FIG. 2, they are performed by control of the line memory. Operation and processing based upon the expression (2) can be similarly performed. Accordingly, image pickup which is the same as that in FIG. 7 can be performed. The memory 12 in the embodiment of FIG. 5 requires a field memory. In contrast to this, the memory of the present embodiment requires a line memory. Accordingly, the present embodiment may be suitable for implementation with ICs.

Figure 17:
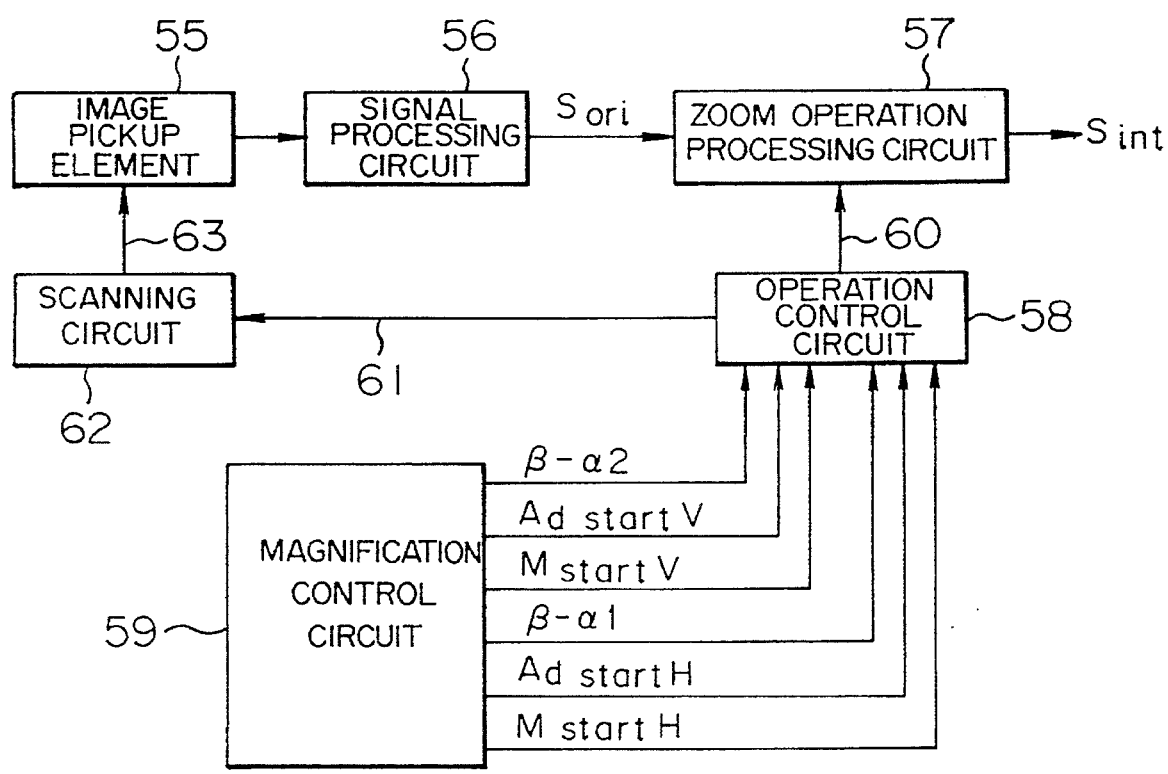
FIG. 17 is a block diagram showing a still further embodiment of an electronic zoom system of the present invention.
Figure 18:
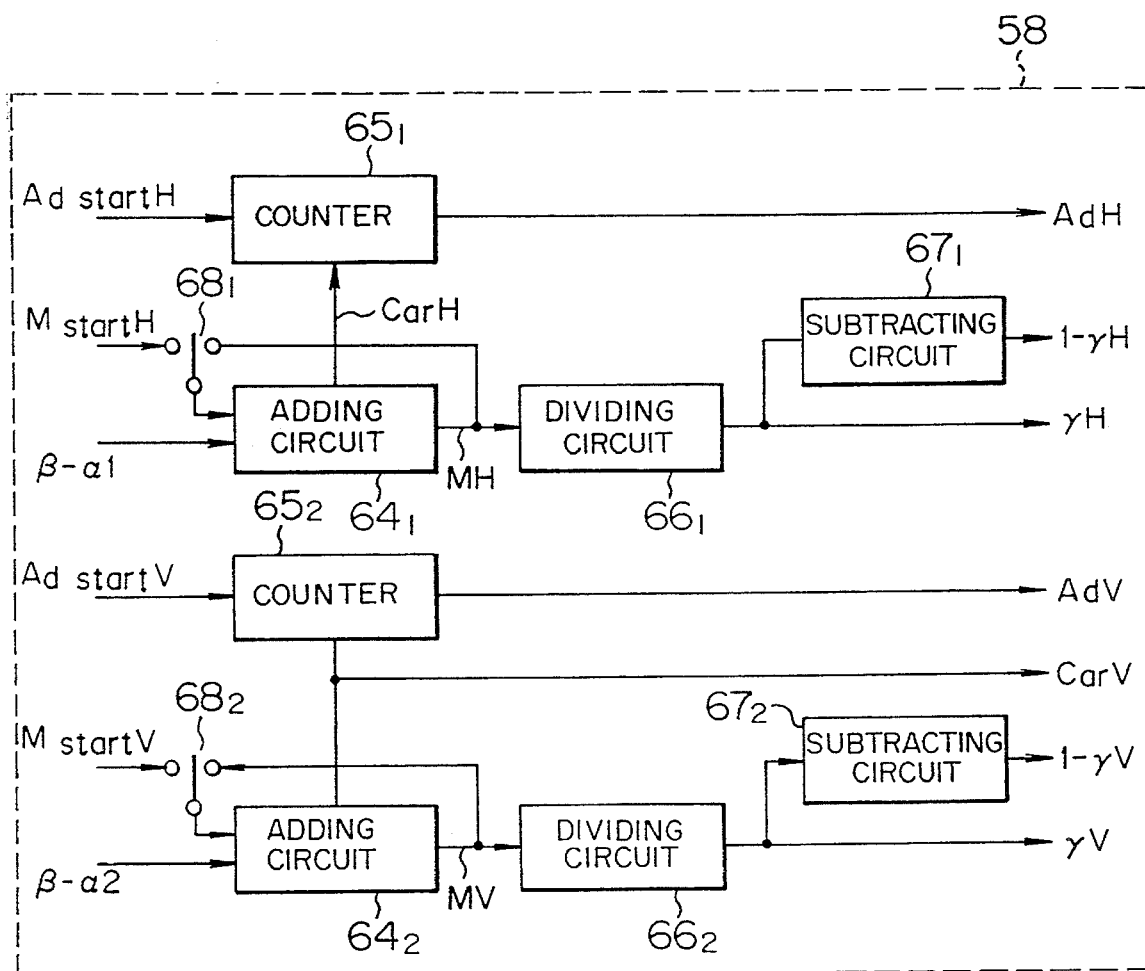
FIG. 18 is a block diagram showing an operation control circuit in the still further embodiment.

A further embodiment of the present invention is shown in FIG. 17. In the drawing, reference numeral 55 denotes an image pickup element; 56, a signal processing circuit; 58, an operation control circuit; 59, a magnification factor control circuit; 60, an operation control signal; 61, a scanning control signal; 62, a scanning circuit; and 63, a scanning address. The present invention is different from the embodiment of FIG. 12 in that an operation start address H for horizontal control, an operation start addition signal M $_{start\ v}$ for vertical control and an operation start addition signal M $_{start\ H}$ for horizontal control can be preset in such a manner that an image which is imaged on a desired position in the photodetecting face of the image pickup element 55 can be zoomed as is done on the example of the image shown in An example of the operation control circuit 58 is shown in FIG. 18. In the drawing, reference numeral 64 denotes an adding circuit; 65, a counter; 66, a dividing circuit; 67, a subtracting circuit; and 68, a switch. The example of FIG. 13 that the state when the operation is started can be preset with $A_{d\ start\ H}$, $M_{start\ H}$, $A_{d\ start\ V}$, and $M_{start\ V}$ as is shown in the example of FIG. 9. Since the operation of control circuit 58 is similar to those of FIGS. 9 and 13, description thereof is omitted.

Figure 19:
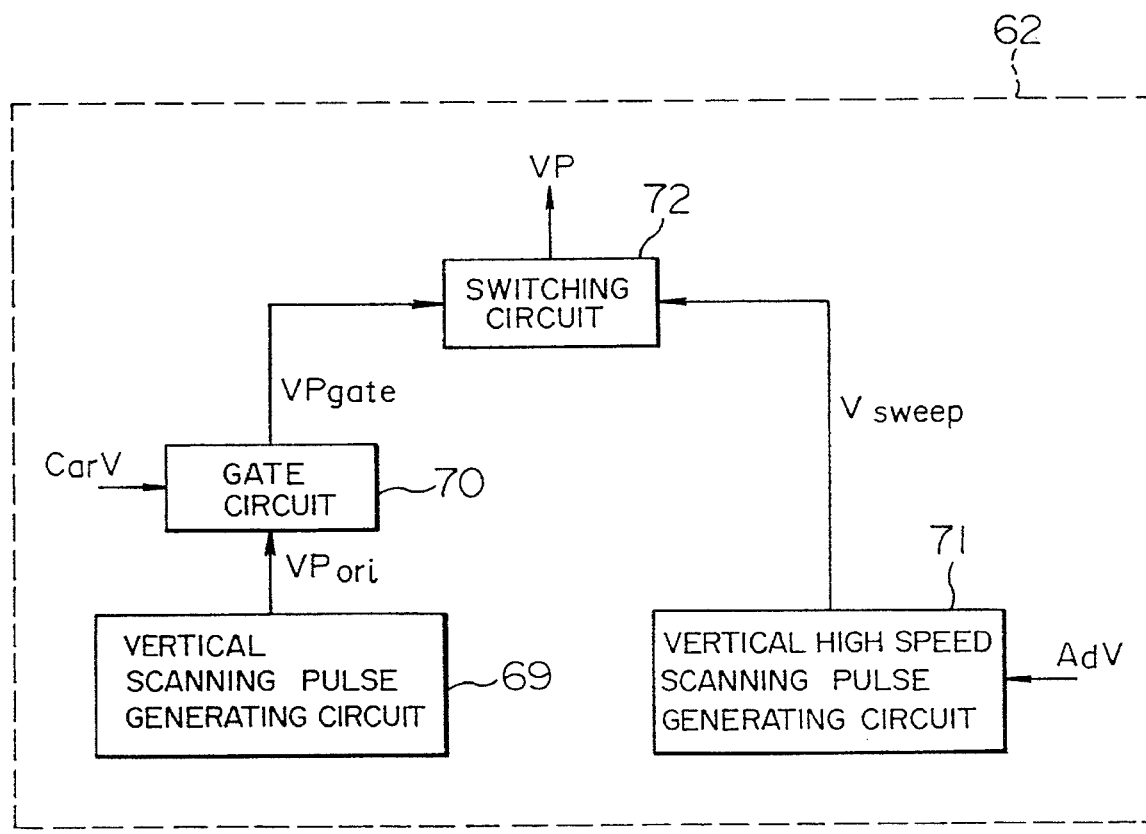
FIG. 19 is a block diagram showing a scanning circuit in the further embodiment.
Figure 20:
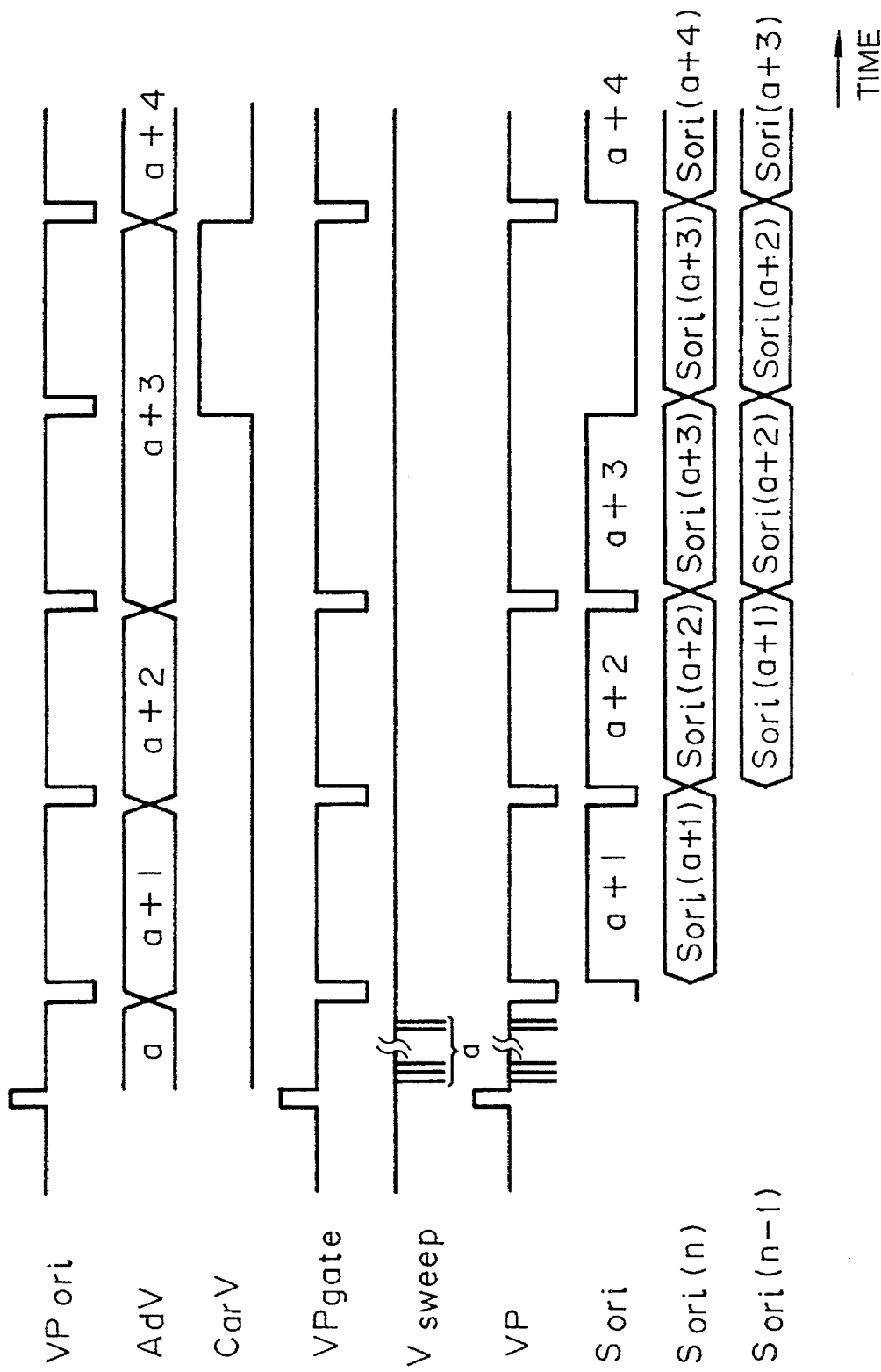
FIG. 20 is a block diagram showing a zoom operation processing circuit in the still further embodiment.

An example of the scanning circuit 62 is shown in FIG. 19. In the drawing, reference numeral 69 denotes a vertical scanning pulse generating circuit; 70, a gate circuit; 71, a vertical high speed scanning pulse generating circuit; and 72, a switching circuit. This example is different from the example of FIG. 14 in that the vertical high speed scanning pulse generating circuit 1 and the switching circuit 72 are added. Operation will be described with reference to FIG. 20. The address $A_{d\ V}$ for vertical control is preliminarily preset to a value "a" with the operation start address AdV for vertical control. The vertical high speed scanning pulse generating circuit 71 generates a vertical high speed scanning pulses $V_{sweep}$. The switching circuit 72 outputs an illustrated vertical scanning pulse $V_p$ by switching this vertical high speed scanning pulse $V_{sweep}$ and the vertical scanning pulse $V_{p\ gate}$ which has passed through the gate circuit 70. At this time vertical scanning has been performed "a" times before starting usual vertical scanning. Accordingly, usual vertical scanning is started from the (a+1)th line. By presetting "a" or $A_{d\ start\ V}$, an image which is imaged on the photodetecting face of the image pickup element 55 at a desired position can be zoomed like the image of FIG. 11.

Since zoom operation processing and control of the electronic zoom magnification factor β/α is performed based upon β-α in accordance with the present invention, power consumption at a low magnification factor which is comparatively frequently used can be suppressed. Since the bits of control data can be effectively used, wiring efficiency of the device is high.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An electronic zoom system, wherein β and α represent the spatial distance between video signals at various stages of zoom processing, said electronic zoom system comprising:

a memory;

a zoom operation processing circuit having a read/write control circuit coupled to said memory for controlling the reading and writing of signals to and from said memory, respectively; and an operation control circuit for controlling said zoom operation processing circuit based upon a result of successive additions of β-α, whereby a video signal is input to said zoom operation processing circuit for electronically magnifying said video signal by a magnification factor of β/α.

2. An electronic zoom system, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said electronic zoom system comprising:

a memory;

a zoom operation processing circuit having a read/write control circuit coupled to said memory for controlling the reading and writing of signals to and from said memory, respectively; and an operation control circuit for controlling said zoom operation processing circuit based upon a result of successive additions of β-α, whereby a video signal is input to said zoom operation processing circuit for electronically magnifying said video signal by a magnification factor of β/α, in which said operation control circuit successively adds β-α1 and β-α2 and in horizontal and vertical directions, respectively, for magnifying said video signal by a magnification factor of β/α1 and β/α2 in horizontal and vertical directions, respectively.

3. An electronic zoom apparatus as defined in claim 2 in which said operation control circuit successively adds β-α1 and β-α2 to a predetermined value in horizontal and vertical directions, respectively.

4. An electronic zoom system, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said electronic zoom system comprising:

a memory;

a zoom operation processing circuit having a read/write control circuit coupled to said memory for controlling the reading and writing of signals to and from said memory, respectively; and an operation control circuit for controlling said zoom operation processing circuit based upon a result of successive additions of β-α, whereby a video signal is input to said zoom operation processing circuit for electronically magnifying said video signal by a magnification factor of $\beta/\alpha$, in which said operation control circuit successively adds $\beta-\alpha$ to a given value.

5. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

a zoom operation processing circuit for electronically magnifying an input video signal;

an operation control circuit for controlling said zoom operation processing circuit based upon a magnification factor control signal input to said operation control circuit; and a magnification factor control circuit, from which $\beta-\alpha$ is output as said magnification factor control signal to said operation control circuit so that said zoom operation processing circuit electronically magnifies the input video signal in a desired portion by a magnification factor of $\beta/\alpha$.

6. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

a zoom operation processing circuit for electronically magnifying an input video signal;

an operation control circuit for controlling said zoom operation processing circuit based upon a magnification factor control signal input to said operation control circuit; and a magnification factor control circuit, from which $\beta-\alpha$ is output as said magnification factor control signal to said operation control circuit so that said zoom operation processing circuit electronically magnifies the input video signal in a desired portion by a magnification factor of $\beta/\alpha$, in which said operation control circuit successively adds $\beta-\alpha 1$ and $\beta-\alpha 2$ in the horizontal and vertical directions, respectively, for magnifying said video signal by a magnification factor of $\beta/\alpha 1$ and $\beta/\alpha 2$ in the horizontal and vertical directions, respectively.

7. An electronic zoom apparatus as defined in claim 6 in which said operation control circuit successively adds $\beta-\alpha 1$ and $\beta-\alpha 2$ to predetermined values in the horizontal and vertical directions, respectively.

8. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

a zoom operation processing circuit for electronically magnifying an input video signal;

an operation control circuit for controlling said zoom operation processing circuit based upon a magnification factor control signal input to said operation control circuit; and a magnification factor control circuit, from which $\beta-\alpha$ is output as said magnification factor control signal to said operation control circuit so that said zoom operation processing circuit electronically magnifies the input video signal in a desired portion by a magnification factor of $\beta/\alpha$, in which said operation control circuit successively adds $\beta-\alpha$ to a given value.

9. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

an image pickup element;

a scanning circuit for supplying a scanning pulse to said image pickup element, said scanning circuit being controlled on the basis of successive additions of $\beta-\alpha 1$; and an operation control circuit for determining whether or not a signal is read from said image pickup element, to thereby effectuate magnification by reading out a video signal in $\alpha$ lines from said image pickup element at a horizontal interval $\beta$ from said image pickup element.

10. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

an image pickup element;

a scanning circuit for supplying a scanning pulse to said image pickup element, said scanning circuit being controlled on the basis of the addition results by successive additions of $\beta-\alpha 1$; and an operation control circuit for determining whether or not a signal is read from said image pickup element, to thereby effectuate magnification by reading out a video signal in $\alpha$ lines from said image pickup element at a horizontal interval $\beta$ from said image pickup element, in which said operation control circuit successively adds $\beta-\alpha$ to a given value.

11. An electronic zoom system, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said electronic zoom system comprising:

an image pickup element;

a scanning circuit for supplying said image pickup element with scanning pulses;

a zoom operation processing circuit to which a video signal read from said image pickup element is input;

an operation control circuit for controlling said scanning circuit and said zoom operation processing circuit based on results of successive additions of $\beta-\alpha$;

a magnification factor control circuit for controlling a scanning starting pixel in the vertical direction and for controlling the start of operation in the horizontal direction, in which a video signal in α lines is read from said image pickup element at a horizontal interval β;

said zoom operation processing circuit being adapted to magnify the video signal read from said image pickup element in the horizontal direction and for interpolating the video signal in vertical and horizontal directions.

12. An electronic zoom system, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said electronic zoom system comprising:

an image pickup element;

a scanning circuit for supplying said image pickup element with scanning pulses;

a zoom operation processing circuit to which a video signal read from said image pickup element is input;

an operation control circuit for controlling said scanning circuit and said zoom operation processing circuit based on results of successive additions of β-α;

a magnification control circuit for controlling a scanning starting pixel in the vertical direction and for controlling the operation start in the horizontal direction, in which a video signal in α lines is read from said image pickup element at a horizontal interval β;

said zoom operation processing circuit being adapted to magnify the video signal read from said image pickup element in the horizontal direction and for interpolating the video signal in vertical and horizontal directions, in which said operation control circuit successively adds β-α1 and β-α2 in horizontal and vertical directions, respectively, for magnifying said video signal by a magnification factor of β/α1 and β/α2 in horizontal and vertical directions, respectively.

13. An electronic zoom apparatus as defined in claim 12 in which said operation control circuit successively adds β-α1 and β-α2 to a predetermined value in horizontal and vertical directions, respectively.

14. An electronic zoom system, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said electronic zoom system comprising:

an image pickup element;

a scanning circuit for supplying said image pickup element with scanning pulses;

a zoom operation processing circuit to which a video signal read from said image pickup element is input;

an operation control circuit for controlling said scanning circuit and said zoom operation processing circuit based on results of successive additions of β-α;

a magnification control circuit for controlling a scanning starting pixel in the vertical direction and for controlling the operation start in the horizontal direction, in which a video signal in α lines is read from said image pickup element at a horizontal interval β;

said zoom operation processing circuit being adapted to magnify the video signal read from said image pickup element in the horizontal direction and for interpolating the video signal in vertical and horizontal directions, in which said operation control circuit successively adds β-α to a given value.

15. A method for controlling an electronic zoom system having a zoom operation processing circuit including a memory, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said method comprising the steps of:

controlling the reading and writing of signals to and from said memory, respectively, in said zoom operation processing circuit;

controlling said zoom operation processing circuit by inputting a video signal to said zoom operation processing circuit and electronically magnifying said video signal by a magnification factor of β/α, wherein said video signal is magnified by a magnification factor of β/α1 or β/α2 in the horizontal and vertical directions, respectively, by successively adding β-α1 or β-α2 in the horizontal and vertical directions, respectively.

16. A method for controlling an electronic zoom system having a zoom operation processing circuit including a memory, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said method comprising the steps of:

controlling the reading and writing of signals to and from said memory, respectively, in said zoom operation processing circuit;

successively adding β-α for controlling said zoom operation processing circuit to derive magnification factor β/α; and processing said signals in accordance with said magnification factor β/α.

17. A method for controlling an electronic zoom system having a zoom operation processing circuit including a memory, wherein β represents the spatial distance between original signals and α represents the spatial distance between interpolated signals, in particular α1 represents the spatial distance between interpolated signals in the horizontal direction and α2 represents the spatial distance between interpolated signals in the vertical direction, at various stages of zoom processing, said method comprising the steps of:

controlling the reading and writing of signals to and from said memory, respectively, in said zoom operation processing circuit;

successively adding β-α1 and β-α2, for controlling operation of said zoom operation processing circuit;

deriving magnification factor β/α; and processing said signals in accordance with said magnification factor β/α.

18. A method for controlling the magnification of a video signal in an electronic zoom system having an operation control circuit, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said method comprising the steps of:

inputting a video signal;

determining a magnification factor $\beta/\alpha$ in accordance with a magnification factor control signal $\beta-\alpha$;

controlling magnification of said video signal in accordance with said operation control circuit; and magnifying said video signal by a magnification factor of $\beta/\alpha 1$ and $\beta/\alpha 2$ in the horizontal and vertical directions, respectively, by successively adding $\beta-\alpha 1$ and $\beta-\alpha 2$ in the horizontal and vertical directions, respectively.

19. A method for controlling the magnification of a video signal in an electronic zoom system having an operation control circuit, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said method comprising the steps of:

inputting a video signal;

determining a magnification factor $\beta/\alpha$ in accordance with a magnification factor control signal $\beta-\alpha$; and controlling magnification of said video signal in accordance with said operation control circuit;

wherein $\beta-\alpha$ is successively added to a given value in said operation control circuit.

20. A method for controlling an electronic zoom system having an operation control circuit including an image pickup element and scanning circuit, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said method comprising the steps of:

supplying a scanning pulse to said image pickup element to control said scanning circuit on the basis of successive additions of $\beta-\alpha$; and determining whether or not a signal is read from said image pickup element to thereby effectuate magnification by reading out a video signal in $\alpha$ lines from said image pickup element at a horizontal interval $\beta$ from said image pickup element.

21. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction, at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction;

interpolating the video signal in vertical and horizontal directions;

wherein said video signal is magnified by a magnification factor of $\beta/\alpha 1$ and $\beta/\alpha 2$ in the horizontal and vertical directions, respectively, by successively adding $\beta-\alpha 1$ and $\beta-\alpha 2$ in the horizontal and vertical directions, respectively.

22. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signal, at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction; and interpolating the video signal in vertical and horizontal directions.

23. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals, in particular $\alpha 1$ represents the spatial distance between interpolated signals in the horizontal direction and $\alpha 2$ represents the spatial distance between interpolated signals in the vertical direction at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction;

interpolating the video signal in vertical and horizontal directions;

wherein $\beta-\alpha 1$ and $\beta-\alpha 2$ are successively added to predetermined values in the horizontal and vertical directions, respectively.

24. A method for controlling an electronic zoom system having a zoom operation processing circuit including a memory, wherein $\beta$ represents the spatial distance between original signals and $\alpha$ represents the spatial distance between interpolated signals, in particular $\alpha 1$ represents the spatial distance between interpolated signals in the horizontal direction, at various stages of zoom processing, said method comprising the steps of:

controlling the reading and writing of signals to and from said memory, respectively, in said zoom operation processing circuit;

controlling said zoom operation processing circuit by inputting a video signal to said zoom operation processing circuit and electronically magnifying said video signal by a magnification factor of $\beta/\alpha$, wherein said video signal is magnified by a magnification factor of $\beta/\alpha 1$ in the horizontal direction, by successively adding $\beta-\alpha 1$ in the horizontal direction.

25. A method for controlling an electronic zoom system having a zoom operation processing circuit including a memory, wherein $\beta$ represents the spatial distance between original signals and $\alpha$ represents the spatial distance between interpolated signals, in particular $\alpha 2$ represents the spatial distance between interpolated signals in the vertical direction, at various stages of zoom processing, said method comprising the steps of:

controlling the reading and writing of signals to and from said memory, respectively, in said zoom operation processing circuit;

controlling said zoom operation processing circuit by inputting a video signal to said zoom operation processing circuit and electronically magnifying said video signal by a magnification factor of $\beta/\alpha$, wherein said video signal is magnified by a magnification factor of $\beta/\alpha 2$ in the vertical direction, by successively adding $\beta-\alpha 2$ in the vertical direction.

26. A method for controlling an electronic zoom system having a zoom operation processing circuit including a memory, wherein $\beta$ represents the spatial distance between original signals and $\alpha$ represents the spatial distance between interpolated signals, at various stages of zoom processing, said method comprising the steps of:

controlling the reading and writing of signals to and from said memory, respectively, in said zoom operation processing circuit;

controlling operation of said zoom operation processing circuit;

deriving magnification factor $\beta/\alpha$ in accordance with a magnification factor control signal $\beta-\alpha$; and processing said signals in accordance with said magnification factor $\beta/\alpha$.

27. A method for controlling the magnification of a video signal in an electronic zoom system having an operation control circuit, wherein $\beta$ represents the spatial distance between original signals and $\alpha$ represents the spatial distance between interpolated signals, in particular $\alpha 1$ represents the spatial distance between interpolated signals in the horizontal direction, at various stages of zoom processing, said method comprising the steps of:

inputting a video signal;

determining a magnification factor $\beta/\alpha$ in accordance with a magnification factor control signal $\beta-\alpha$;

controlling magnification of said video signal in accordance with said operation control circuit; and magnifying said video signal by a magnification factor of $\beta/\alpha 1$ in the horizontal direction by successively adding $\beta-\alpha 1$ in the horizontal directions.

28. A method for controlling the magnification of a video signal in an electronic zoom system having an operation control circuit, wherein $\beta$ represents the spatial distance between original signals and $\alpha$ represents the spatial distance between interpolated signals, in particular $\alpha 2$ represents the spatial distance between interpolated signals in the vertical direction, at various stages of zoom processing, said method comprising the steps of:

inputting a video signal;

determining a magnification factor $\beta/\alpha$ in accordance with a magnification factor control signal $\beta-\alpha$;

controlling magnification of said video signal in accordance with said operation control circuit; and magnifying said video signal by a magnification factor of $\beta/\alpha 2$ in the vertical direction by successively adding $\beta-\alpha 2$ in the vertical direction.

29. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals, in particular $\alpha 1$ represents the spatial distance between interpolated signals in the horizontal direction, at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction;

interpolating the video signal in vertical and horizontal directions;

wherein said video signal is magnified by a magnification factor of $\beta/\alpha 1$ in the horizontal direction by successively adding $\beta-\alpha 1$ in the horizontal directions.

30. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals, in particular $\alpha 2$ represents the spatial distance between interpolated signals in the vertical direction, at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction;

interpolating the video signal in vertical and horizontal directions;

wherein said video signal is magnified by a magnification factor of $\beta/\alpha 2$ in the vertical direction by successively adding $\beta-\alpha 2$ in the vertical direction.

31. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction; and interpolating the video signal in the horizontal directions.

32. A method for controlling the magnification of a video signal in an electronic zoom system having an image pickup element, a scanning circuit and an operation control circuit, wherein $\beta$ represents the spatial distance between original signals and $\alpha$ represents the spatial distance between interpolated signals at various stages of zoom processing, said method comprising the steps of:

inputting a video signal;

supplying said image pickup element with scanning pulses;

controlling scanning and zoom processing of said video signal based on results of successive additions of $\beta-\alpha$;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction; and interpolating the video signal in the vertical directions.

33. A method for controlling the magnification of a video signal in an electronic zoom system having an image pickup element, a scanning circuit and an operation control circuit which controls said scanning circuit in accordance with a magnification factor control signal $\beta-\alpha$, wherein $\beta$ represents the spatial distance between original signals and $\alpha$ represents the spatial distance between interpolated signals at various stages of zoom processing, said method comprising the steps of:

inputting a video signal;

supplying said image pickup element with scanning pulses;

controlling scanning and zoom processing of said video signal;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction; and interpolating the video signal in the horizontal direction.

34. A method for controlling the magnification of a video signal in an electronic zoom system having an image pickup element, a scanning circuit and an operation control circuit which controls said scanning circuit in accordance with a magnification factor control signal $\beta-\alpha$, wherein $\beta$ represents the spatial distance between original signals and $\alpha$ represents the spatial distance between interpolated signals at various stages of zoom processing, said method comprising the steps of:

inputting a video signal;

supplying said image pickup element with scanning pulses;

controlling scanning and zoom processing of said video signal;

controlling a scanning starting pixel in the vertical direction and for controlling the operation start in the vertical direction, in which the video signal in $\alpha$ lines is read from said image pickup element at a horizontal interval $\beta$;

magnifying the video signal read from said image pickup element in the horizontal direction; and interpolating the video signal in the vertical direction.

* * * * *